(12) United States Patent
Takeuchi

(10) Patent No.: US 8,881,211 B2
(45) Date of Patent: Nov. 4, 2014

(54) VIDEO PLAYER SYSTEM WITH TRANSMISSION DEVICE FOR TRANSMITTING CONTENT TO CONTENT PLAYER DEVICE FOR CONTENT PLAYBACK BASED CONSUMPTION RESOURCE INFORMATION

(75) Inventor: Kazuma Takeuchi, Kanagawa (JP)

(73) Assignee: Panasonic Intellectual Property Corporation of America, Torrance, CA (US)

( * ) Notice: Subject to any disclaimer, the term of this patent is extended or adjusted under 35 U.S.C. 154(b) by 106 days.

(21) Appl. No.: 13/257,739

(22) PCT Filed: Jan. 24, 2011

(86) PCT No.: PCT/JP2011/000356
§ 371 (c)(1),
(2), (4) Date: Dec. 6, 2011

(87) PCT Pub. No.: WO2011/096168
PCT Pub. Date: Aug. 11, 2011

(65) Prior Publication Data
US 2012/0102532 A1 Apr. 26, 2012

(30) Foreign Application Priority Data
Feb. 8, 2010 (JP) ................................ 2010-025076

(51) Int. Cl.
*H04N 7/173* (2011.01)
*H04N 21/654* (2011.01)
(Continued)

(52) U.S. Cl.
CPC ....... *H04N 21/654* (2013.01); *H04N 21/47217* (2013.01); *H04N 21/2385* (2013.01); *H04N 7/17318* (2013.01); *H04N 21/235* (2013.01); *H04N 21/435* (2013.01); *H04N 21/45* (2013.01); *H04N 21/458* (2013.01); *H04N 21/47202* (2013.01); *H04N 21/6332* (2013.01); *H04N 21/6547* (2013.01)
USPC ............. 725/93; 725/116; 725/131; 725/146; 725/151

(58) Field of Classification Search
CPC ............. H04N 21/23; H04N 21/2385; H04N 21/2387; H04N 21/47; H04N 21/472; H04N 21/47217; H04N 21/654; H04N 21/435; H04N 7/17318
USPC ............... 725/86, 87, 91–93, 95, 96, 98, 114, 725/116, 131, 141, 144, 146, 151
See application file for complete search history.

(56) References Cited

U.S. PATENT DOCUMENTS

| | | | | |
|---|---|---|---|---|
| 2002/0144276 | A1* | 10/2002 | Radford et al. | 725/87 |
| 2003/0149988 | A1* | 8/2003 | Ellis et al. | 725/87 |
| 2009/0049465 | A1* | 2/2009 | Deng | 725/9 |
| 2010/0058396 | A1* | 3/2010 | Russell et al. | 725/60 |

FOREIGN PATENT DOCUMENTS

| | | |
|---|---|---|
| JP | 2007-4493 | 1/2007 |
| JP | 2007-221805 | 8/2007 |

(Continued)

*Primary Examiner* — Farzana Hossain
(74) *Attorney, Agent, or Firm* — Greenblum & Bernstein, P.L.C.

(57) ABSTRACT

A video playback system, transmission apparatus, and content playback apparatus are provided that are capable of performing accurate resource prediction when playing back content via a network. A transmission apparatus generates consumption resource information in which a playback time and band information of content corresponding to the playback time are paired from management information of content to be played back, and transmits this consumption resource information to a content playback apparatus. Utilizing consumption resource information transmitted from the transmission apparatus, the content playback apparatus predicts a resource that will be consumed by the content playback apparatus, using a table held in the content playback apparatus, according to the playback time and playback mode.

8 Claims, 11 Drawing Sheets

(51) Int. Cl.
*H04N 21/472* (2011.01)
*H04N 21/2385* (2011.01)
*H04N 21/235* (2011.01)
*H04N 21/435* (2011.01)
*H04N 21/45* (2011.01)
*H04N 21/458* (2011.01)
*H04N 21/6332* (2011.01)
*H04N 21/6547* (2011.01)

(56) References Cited

FOREIGN PATENT DOCUMENTS

JP    2009-105477    5/2009
JP    2010-113460    5/2010

* cited by examiner

601: MANAGEMENT INFORMATION

| PLAYBACK TIMING INFORMATION | FILE OFFSET INFORMATION |
|---|---|
| 26.0137 | 00000000 |
| 26.5137 | 11543616 |
| 27.0137 | 22500096 |
| 27.5137 | 34559040 |

FIG.6 A

604: CONSUMPTION RESOURCE INFORMATION

| PLAYBACK TIMING INFORMATION | BAND INFORMATION |
|---|---|
| 26.0137 | 23087232 |
| 26.5137 | 21912960 |
| 27.0137 | 24117888 |
| 27.5137 | 21016320 |

FIG.6 B

701: RESOURCE PREDICTION TABLE

| BAND INFORMATION | CPU UTILIZATION | DMA OCCUPANCY | NECESSARY AMOUNT OF MEMORY |
|---|---|---|---|
| 25000000 ~ 22000000 | 34 | 45 | 8 |
| 22000000 ~ 18000000 | 33 | 42 | 7 |
| 18000000 ~ 15000000 | 32 | 40 | 7 |
| 15000000 ~ 12000000 | 31 | 34 | 6 |

VIDEO PLAYER SYSTEM WITH TRANSMISSION DEVICE FOR TRANSMITTING CONTENT TO CONTENT PLAYER DEVICE FOR CONTENT PLAYBACK BASED CONSUMPTION RESOURCE INFORMATION

This application is a 371 application of PCT Application No. PCT/JP2011/000356, filed Jan. 24, 2011 and claiming the benefit of priority from Japanese Patent Application No. 2010-025076, filed Feb. 8, 2010.

TECHNICAL FIELD

The present invention relates to a playback apparatus that plays back content recorded in a transmission apparatus, via a video playback system network. More particularly, the present invention relates to a content playback apparatus that exchanges information on a consumed resource beforehand, and accurately predicts a resource that is consumed at the time of playback.

BACKGROUND ART

With more and more conventional content playback apparatuses such as hard disk recorders offering multifunctionality, and simultaneously executing various kinds of processing such as playback processing, recording processing, dubbing processing, viewing processing, and so forth, efficient resource utilization has become a problem. Here, a resource means DMA (Direct Memory Access), a CPU (Central Processing Unit), a bus band, a decoder, an encoder, or the like, used in execution of the above processing.

When a function that performs real-time processing, such as a playback/recording function, is operated at the same time as another function, measures are taken to limit simultaneously operated functions in order to prevent real-time processing being affected from the standpoint of efficient resource utilization.

Also, with network coordination functions, it has become possible to connect a plurality of video recording apparatuses in a network, and utilize home network service coordination such as DLNA (Digital Living Network Alliance). As a network linking function, a video recording apparatus can, for example, acquire video data recorded in another video recording apparatus via a network, and play back the acquired video data itself (see Patent Literature 1, for example).

CITATION LIST

Patent Literature

PTL 1
Japanese Patent Application Laid-Open No. 2007-004493

SUMMARY OF INVENTION

Technical Problem

However, with a conventional method, resource reallocation is performed based on content unit average bit rate information. Consequently, a problem with content created by combining content with different bit rates by means of content editing, or the like, is that resource reallocation is not performed and resource utilization efficiency falls.

It is therefore an object of the present invention to provide a video playback system, transmission apparatus, and content playback apparatus capable of performing accurate resource prediction when playing back content via a network.

Solution to Problem

A video playback system of the present invention performs streaming playback of content recorded in a transmission apparatus, by means of a content playback apparatus connected via a network, and employs a configuration wherein: transmission apparatus has a content recording section that records the content, a management information recording section that records management information that includes playback timing information and a file offset of the content, a resource information generation section that generates consumption resource information mutually associating a playback time of the content and content band information based on the management information, and a transmission control section that controls transmission of the content and the consumption resource information; and the content playback apparatus has a content selection section that selects content that is played back and requests the selected content from the transmission apparatus, a playback control section that acquires the selected content from the transmission apparatus via a network, a resource information acquisition section that acquires the consumption resource information corresponding to the content, a content playback section that plays back the acquired content, and a resource prediction section that calculates band information of the content that is played back after an arbitrary elapse of time, based on a playback time obtained from the content playback section, playback mode information, and the consumption resource information.

A transmission apparatus of the present invention transmits content to a content playback apparatus connected via a network, and employs a configuration having: a content recording section that records the content; a management information recording section that records management information that includes playback timing information and a file offset of the content; a resource information generation section that generates consumption resource information mutually associating a playback time of the content and content band information at the playback time based on the management information; and a transmission control section that controls transmission of the content and the consumption resource information.

A content playback apparatus of the present invention plays back content transmitted from a transmission apparatus via a network, and employs a configuration having: a content selection section that selects content that is played back and requests the selected content from the transmission apparatus; a playback control section that acquires the selected content from the transmission apparatus via a network; a resource information acquisition section that acquires consumption resource information corresponding to the content; a content playback section that plays back the acquired content; and a resource prediction section that calculates band information of content that is played back after an arbitrary elapse of time, based on a playback time obtained from the content playback section, a playback mode, and the consumption resource information.

Advantageous Effects of Invention

The present invention enables a necessary resource to be known accurately by a content playback apparatus when playing back content via a network. By this means, the present invention enables resource reallocation to be performed and resource utilization efficiency to be improved even for content created by combining content with different bit rates by means of content editing.

BRIEF DESCRIPTION OF DRAWINGS

FIG. 6A is a drawing showing an overview of content management information, and FIG. 6B is a drawing showing an overview of consumption resource information, according to an embodiment of the present invention;

FIG. 7 is a drawing showing an example of a resource prediction table held in a resource prediction section of a content playback apparatus according to an embodiment of the present invention;

DESCRIPTION OF EMBODIMENT

Now, an embodiment of the present invention will be described in detail with reference to the accompanying drawings.

Embodiment

Figure 1:
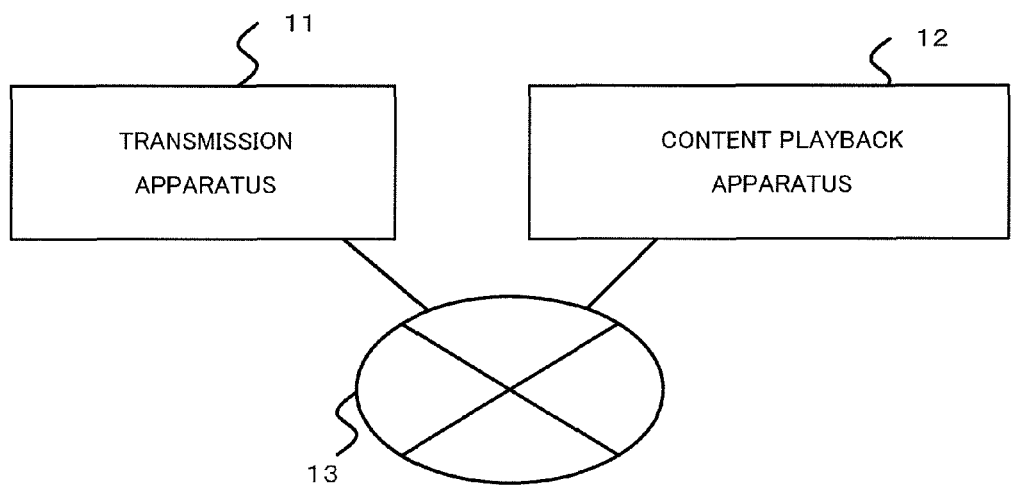
FIG. 1 is a drawing showing an overview of a video playback system according to an embodiment of the present invention.

FIG. 1 is a drawing showing an overview of a video playback system according to an embodiment of the present invention.

In a video playback system, transmission apparatus 11 and content playback apparatus 12 are mutually connected via network 13. Transmission apparatus 11 and content playback apparatus 12 are capable of utilizing home network service coordination such as DLNA. A video playback system can be configured if there is at least one transmission apparatus 11 and one content playback apparatus 12.

Transmission apparatus 11 is provided with a recording medium such as a hard disk, and stores content on this recording medium. Content may be music data as well as video data.

In the video playback system in FIG. 1, the following procedure is used when content recorded in transmission apparatus 11 is played back by content playback apparatus 12.

First, content playback apparatus 12 selects content to be played back. Then content playback apparatus 12 acquires consumption resource information from transmission apparatus 11. Following this, content playback apparatus 12 acquires content from transmission apparatus 11 and plays back the acquired content.

By this means, when content recorded in another device is played back by content playback apparatus 12, content playback apparatus 12 can accurately predict a consumed resource.

Transmission apparatus 11 and content playback apparatus 12 are AV (Audio Visual) devices such as TV sets or video player/recorders, for example. Computer Transmission apparatus 11 and content playback apparatus 12 may also be computer terminals such as PCs (Personal Computers) or workstations, for example. Alternatively, transmission apparatus 11 and content playback apparatus 12 may be mobile terminals such as car navigation systems, PDAs (Personal Digital Assistants), or mobile phones.

Figure 2:
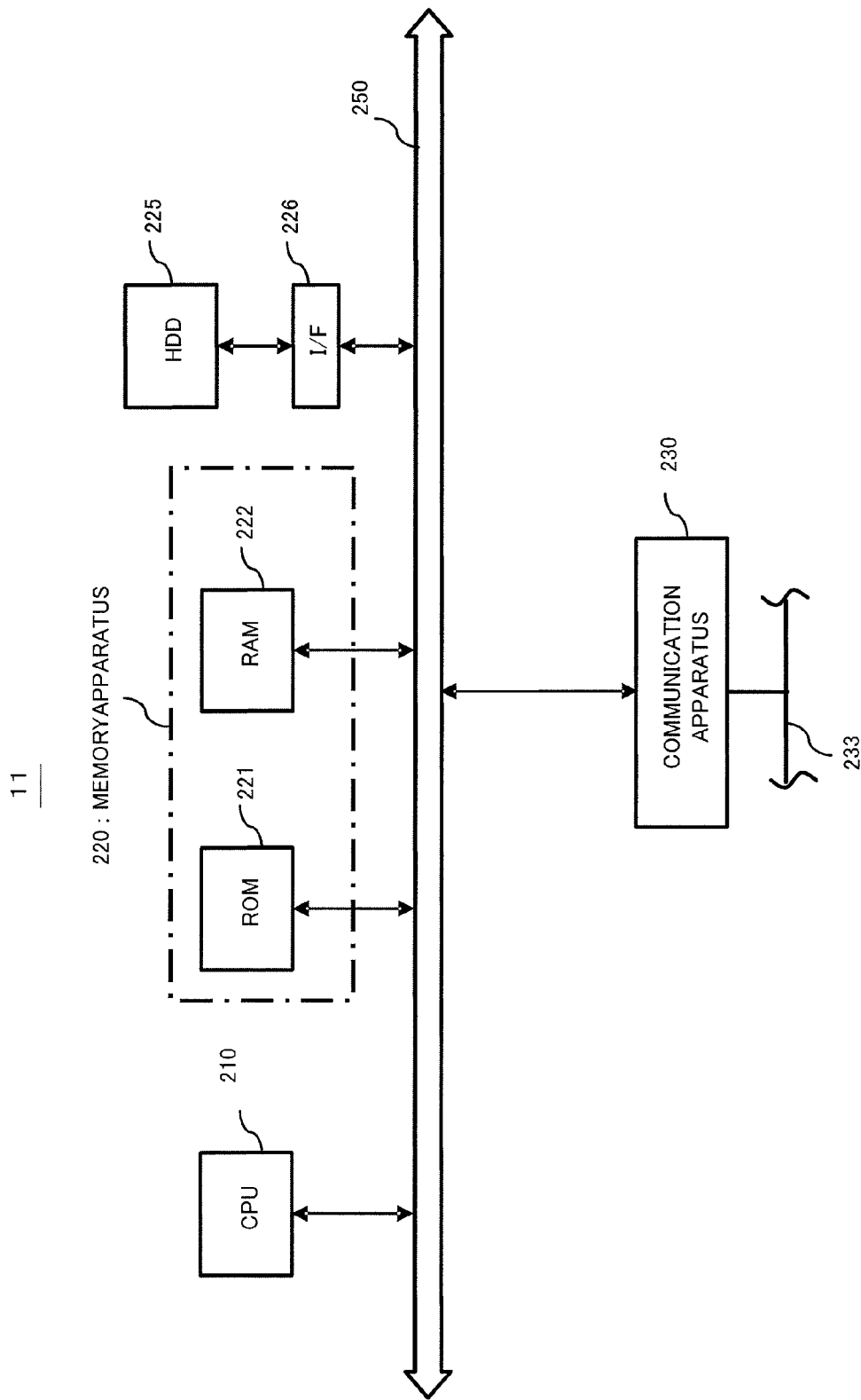
FIG. 2 is a drawing showing an example of the hardware configuration of a transmission apparatus according to an embodiment of the present invention.

FIG. 2 is a drawing showing an example of the hardware configuration of transmission apparatus 11 according to an embodiment of the present invention.

Transmission apparatus 11 is provided with CPU 210, memory apparatus 220, communication apparatus 230, and hard disk drive (HDD) 225. These apparatuses are mutually connected via bus line 250. Hard disk drive 225 is connected to bus line 250 via interface (I/F) 226.

CPU 210 may be a single CPU or comprise a plurality of CPUs. FIG. 2 shows an example in which a single CPU 210 is used.

Memory apparatus 220 is provided with ROM (Read Only Memory) 221 and RAM (Random Access Memory) 222. ROM 221 stores a computer program and data stipulating the operation of CPU 210. The computer program and data can be stored on hard disk drive 225. CPU 210 writes a computer program and data stored by ROM 221 or hard disk drive 225 to RAM 222 as necessary, and executes processing stipulated by the computer program. RAM 222 functions as a medium that temporarily stores data generated as CPU 210 executes processing. Memory apparatus 220 includes a writable non-volatile storage medium that can retain its storage contents even if power is turned off, such as flash memory or the like.

Hard disk drive 225 is an apparatus that records and holds data including a computer program and content. Content may include not only video content obtained by recording of a broadcast wave by an information processing apparatus, but also video content, speech content, and so forth, recorded via a network or recorded by means of dubbing or the like.

Communication apparatus 230 exchanges computer programs or data between itself and an external apparatus via communication channel 233, which may be a telephone line, network channel, radio channel, infrared communication channel, or the like.

When an above computer program is supplied from ROM 221 as a program recording medium, installing that ROM 221 in transmission apparatus 11 makes it possible for CPU 210 to execute processing in accordance with the above computer program. Also, when a computer program is supplied via a transmission medium such as communication channel 233, the computer program is received via communication apparatus 230, and stored in RAM 222 or on hard disk drive 225, for example. In this way, it is possible for a computer program to be supplied via hard disk drive 225 or to be supplied via a transmission medium such as communication channel 233. A transmission medium here is not limited to a cable transmission medium, but may also be a radio transmission medium. Also, a transmission medium need not be a communication channel, but may include a relay apparatus that performs communication channel relaying, such as a router, for example.

Below, transmission apparatus 11 is described as already having stored received broadcast program content. Content storage is not limited to broadcast wave recording, but may also be performed by means of recording via a network, dubbing, and so forth.

Figure 3:
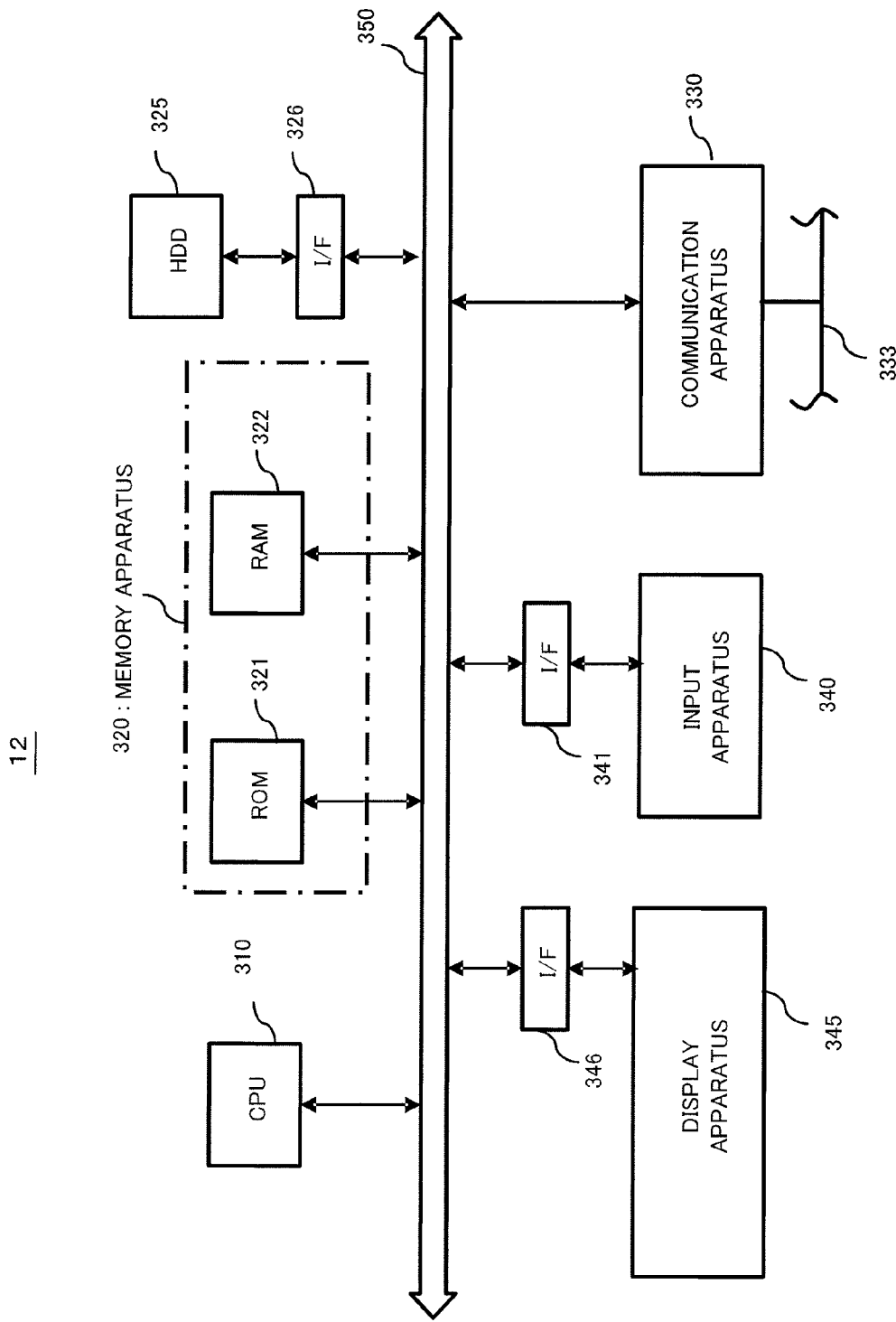
FIG. 3 is a drawing showing an example of the hardware configuration of a content playback apparatus according to an embodiment of the present invention.

FIG. 3 is a drawing showing an example of the hardware configuration of a content playback apparatus according to an embodiment of the present invention.

Content playback apparatus 12 is provided with CPU 310, memory apparatus 320, communication apparatus 330, input apparatus 340, and display apparatus 345. These apparatuses are mutually connected via bus line 350. Hard disk drive 325, input apparatus 340, and display apparatus 345 are connected to bus line 250 via interfaces (I/Fs) 326, 341, and 346, respectively.

CPU 310 may be a single CPU or comprise a plurality of CPUs. Content playback apparatus 12 in FIG. 3 shows an example of the use of a single CPU 310.

Memory apparatus 320 is provided with ROM 321 and RAM 322. ROM 321 stores a computer program and data stipulating the operation of CPU 310. CPU 310 writes a computer program and data stored by ROM 321 to RAM 322 as necessary, and executes processing stipulated by the computer program. RAM 322 functions as a medium that temporarily stores data generated as CPU 310 executes processing. Memory apparatus 320 includes a writable nonvolatile storage medium that can retain its storage contents even if power is turned off, such as flash memory or the like.

Hard disk drive 325 is an apparatus that records and holds data including a computer program and content.

Communication apparatus 330 exchanges computer programs or data between itself and an external apparatus via communication channel 333, which may be a telephone line, network channel, radio channel, infrared communication channel, or the like.

Input apparatus 340 is an apparatus that inputs data or the like by means of a user operation, and is, for example, an input button provided on an AV device, a keyboard provided on a PDA, or a mouse and keyboard. Input apparatus 340 may also be a remote control apparatus for an AV device. Display apparatus 345 is an apparatus that displays a moving image, still image, or the like on a screen, and outputs speech, and includes, for example, an LCD (Liquid Crystal Display), plasma display apparatus, CRT, speaker, and so forth. Input apparatus 340 and display apparatus 345 are connected to bus line 350 via interfaces 341 and 342 respectively.

When an above computer program is supplied from ROM 321 as a program recording medium, installing that ROM 321 in content playback apparatus 12 makes it possible for CPU 310 to execute processing in accordance with the above computer program. Also, when a computer program is supplied via a transmission medium such as communication channel 333, the computer program is received via communication apparatus 330, and stored in RAM 322 or on hard disk drive 325, for example. In this way, it is possible for a computer program to be supplied via hard disk drive 325 or to be supplied via a transmission medium such as communication channel 333. A transmission medium here is not limited to a cable transmission medium, but may also be a radio transmission medium. Also, a transmission medium need not be a communication channel, but may include a relay apparatus that performs communication channel relaying, such as a router, for example.

In this embodiment, both transmission apparatus 11 and content playback apparatus 12 may be provided in a single apparatus.

Figure 4:
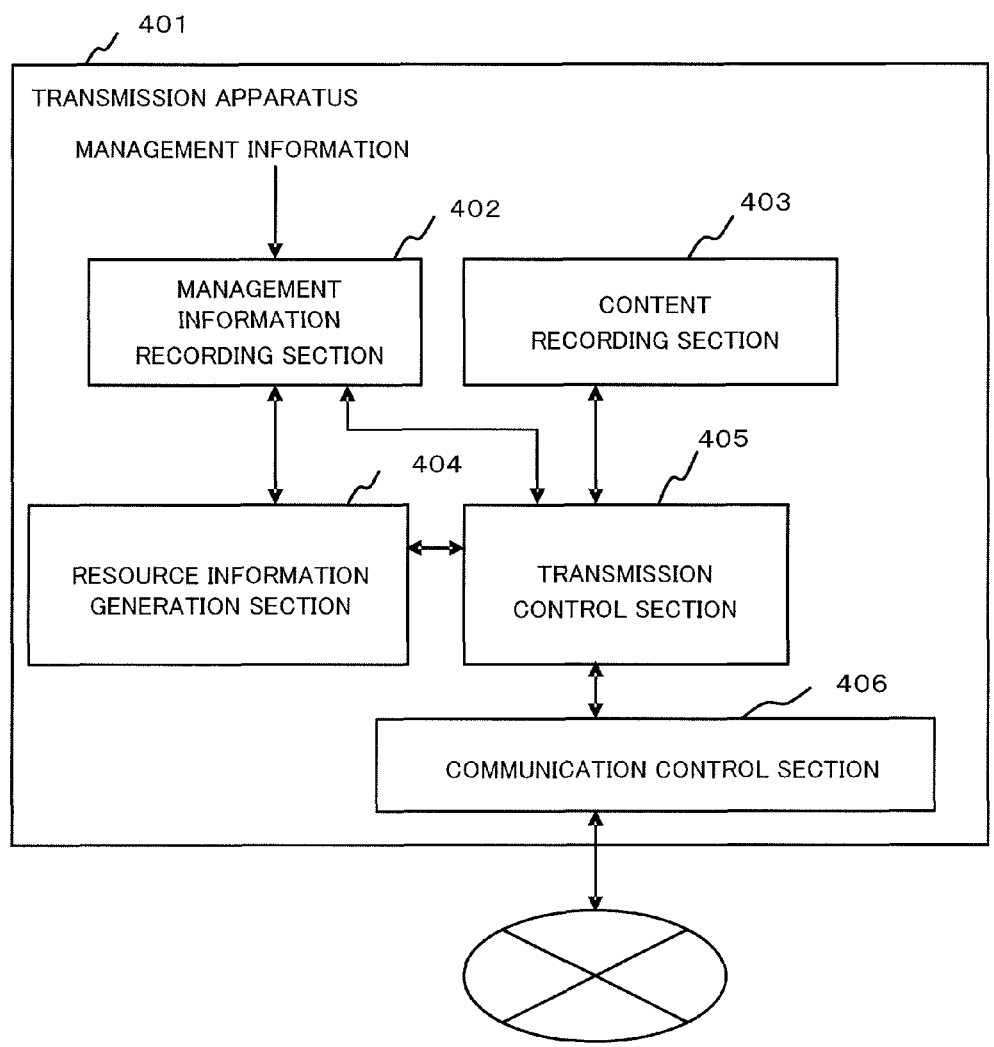
FIG. 4 is a block diagram showing an example of the configuration of a transmission apparatus according to an embodiment of the present invention.

FIG. 4 is a block diagram showing an example of the configuration of a transmission apparatus according to an embodiment of the present invention. Transmission apparatus 401 in FIG. 4 is applied to transmission apparatus 11 in FIG. 1. On receiving a resource information request from content playback apparatus 12, transmission apparatus 401 generates consumption resource information for the relevant content and transmits this to content playback apparatus 12. Also, on receiving a content request from content playback apparatus 12, transmission apparatus 401 transmits the relevant content to content playback apparatus 12.

Transmission apparatus 401 is provided with content recording section 403, transmission control section 405, resource information generation section 404, management information recording section 402, and communication control section 406.

Content recording section 403 is a recording medium that records content. Content recording section 403 corresponds to hard disk drive 225 in FIG. 2.

Communication control section 406 controls data transmission and reception to/from an external device via a network. Communication control section 406 corresponds to a program run on CPU 210, and communication apparatus 230, shown in FIG. 2.

On receiving a playback content resource information request from another device connected via a network, transmission control section 405 issues a consumption resource information generation request to resource information generation section 404. Transmission control section 405 transmits consumption resource information generated by resource information generation section 404 to the other device that requested the resource information.

Here, consumption resource information is information in which playback timing information indicating a playback time, and band information, are paired. Band information indicates a resource amount, or band, necessary for content playback. Below, a resource amount or band necessary for content playback is a playback condition. Details of consumption resource information will be given later herein.

Transmission control section 405 also receives a content request from another device connected via a network. Transmission control section 405 transmits requested playback content to a requesting device from content recorded in content recording section 403.

Resource information generation section 404 is requested to generate consumption resource information by transmission control section 405. Then resource information generation section 404 acquires management information for the requested playback content from management information recording section 402. Resource information generation section 404 generates consumption resource information based on the management information.

Management information recording section 402 is a recording medium that acquires management information corresponding to content recorded in content recording section 403 from an external source, and records that acquired management information. Transmission control section 405 and communication control section 406 read management information recorded in management information recording section 402, and report that management information to content playback apparatus 12.

Content management information is, for example, a clip-info file or play-list file stipulated in the BD-RE (Blu-ray Disc REwritable) standard. Management information recording section 402 records data necessary for random access as content management information, and records a section of data to be played back.

Figure 5:
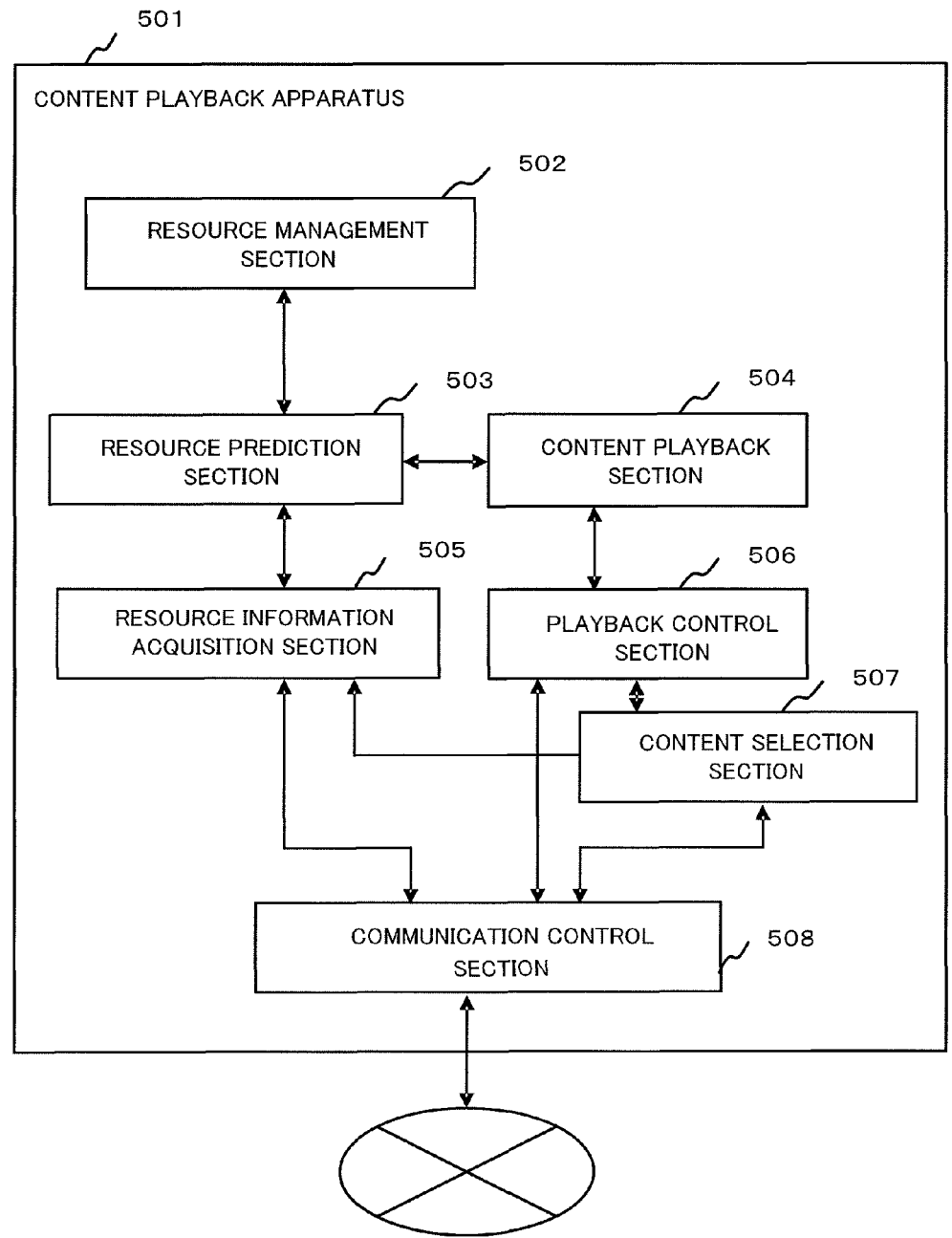
FIG. 5 is a block diagram showing an example of the configuration of a content playback apparatus according to an embodiment of the present invention.

FIG. 5 is a block diagram showing an example of the configuration of a content playback apparatus according to an embodiment of the present invention. Content playback apparatus 501 in FIG. 5 is applied to content playback apparatus 12 in FIG. 1. Content playback apparatus 501 acquires consumption resource information for playback content from transmission apparatus 401 beforehand, and subsequently plays back playback content.

Content playback apparatus 501 is provided with content selection section 507, communication control section 508, playback control section 506, content playback section 504, resource information acquisition section 505, resource prediction section 503, and resource management section 502.

Content selection section 507 selects content to be played back by content playback apparatus 501 from among content stored in another device via a network. Specifically, content selection section 507 first acquires content information stored in a device connected to the network using communication control section 508. Content information is, for example, a content list or the like acquired by means of CDS (Content Directory Service) according to the DLNA standard. Using the acquired content information, content selection section 507 then presents the user with a list of content by means of a GUI or the like. Content selection section 507 selects content to be played back in accordance with a user input operation. Content selection section 507 also reports information on the decided playback content to resource information acquisition section 505. Following this, content selection section 507 reports playback content information to playback control section 506.

Resource information acquisition section 505 is notified of playback content information by content selection section 507. Then resource information acquisition section 505 uses communication control section 508 to transmit a consumption resource information acquisition request to transmission apparatus 401 in which the playback content is stored. Resource information acquisition section 505 also reports the acquired consumption resource information to resource prediction section 503.

Playback control section 506 is notified of the playback content information by content selection section 507. Then playback control section 506 uses communication control section 508 to acquire playback content from transmission apparatus 401 in which the playback content is stored. Playback control section 506 then transfers the acquired playback content sequentially to content playback section 504. If the content playback mode is changed by means of a user input operation during playback, playback control section 506 reports this change to content playback section 504.

Playback modes are, for example, normal-speed forward playback, double-speed forward playback, pause, normal-speed reverse playback, and so forth.

Communication control section 508 controls data transmission and reception to/from an external device via a network. Communication control section 508 corresponds to a program run on CPU 310, and communication apparatus 330, shown in FIG. 3.

Content playback section 504 acquires playback content from playback control section 506. Then content playback section 504 expands the contents of playback content, and displays the result on a display apparatus (not shown) (display apparatus 345 in FIG. 3). In the event of receiving a playback mode change notification from playback control section 506 during content playback, content playback section 504 changes the playback mode.

Resource management section 502 decides a resource to be allocated to parallel processing executed simultaneously on content playback apparatus 501. Resource management section 502 decides an execution time for non-real-time processing from among a user input operation and parallel processing generated by a timer, and performs resource allocation. Specifically, when performing resource allocation, resource management section 502 issues an inquiry to resource prediction section 503. Then resource management section 502 acquires resource information necessary for subsequent content playback, decides possible execution time for parallel processing to be executed, and performs resource allocation.

Here, a resource is, for example, DMA, a CPU, a bus band, a decoder, an encoder, or the like, used in playback processing, recording processing, dubbing processing, viewing processing, and so forth. In addition, hardware, software, and the like used in data processing of content via a network can also be included in resources of the present invention.

Resource prediction section 503 utilizes consumption resource information reported from resource information acquisition section 505, a playback mode and playback time acquired from content playback section 504, and an internally held resource prediction table, to predict a consumed resource.

On receiving an inquiry from resource management section 502, resource prediction section 503 reports predicted consumption resource information for the present onward to resource management section 502. Specifically, resource prediction section 503 searches for band information corresponding to a playback time obtained by issuing an inquiry to content playback section 504 from consumption resource information. Resource prediction section 503 searches for a resource corresponding to discovered band information from a resource prediction table corresponding to the playback mode. Resource prediction section 503 repeats this procedure, and generates predicted consumption resource information for the present onward.

As described above, according to a transmission apparatus, content playback apparatus, and video playback system of the present invention, it is possible to accurately predict resources necessary for performing streaming playback via a network for individual content with different playback conditions.

By this means, in this embodiment, even when playing back special content combining content with different bit rates, it is possible to distribute resources to individual content parts with different bit rates within a single content, and improve resource utilization efficiency. By this means, in this embodiment, execution of simultaneous parallel processing or the like can easily be implemented when playing back special content such as content combining content with different bit rates.

Next, a detailed description will be given of consumption resource information contents, a consumption resource information generation method, and a resource prediction table in resource prediction section 503, using FIG. 6 and FIG. 7.

FIG. 6A is a drawing showing an overview of content management information according to an embodiment of the present invention, and FIG. 6B is a drawing showing an overview of consumption resource information.

Playback timing information 602 included in management information 601 shown in FIG. 6A is information representing a playback time. Information representing a playback time is, for example, information representing a playback time converted to second units by dividing display time information (PTS) of the MPEG2 (Moving Picture Experts Group-2) standard or the like by 90000. A playback timing information 602 playback time indicates a playback time from the start of a playback interval of content stored in content management information.

File offset information 603 included in management information 601 is obtained by multiplying a Source Packet Number (SPN) corresponding to a presentation time stamp by the packet size of 192 bytes. That is to say, file offset information 603 indicates an offset from the start of a file in byte units.

FIG. 6B shows consumption resource information 604. Consumption resource information 604 is represented as a pair of information items: playback timing information 605 representing a playback time, and band information 606. A playback timing information 605 playback time indicates a playback time from the start of a content playback interval stored in content management information. Band information 606 is information indicating a resource amount, or band, necessary for content playback. Band information 606 is calculated as a value obtained by dividing a file offset information 603 change amount by a playback timing information 602 change amount.

Next, a case will be described in which, for example, consumption resource information 604 including band information 607 is found from information included in a clip-info file according to the BD-RE standard. First, resource prediction section 503 finds the difference of "26.0137" from playback timing information "26.5137" in management information 601. Next, resource prediction section 503 finds the difference between file offset information 603 "11543616" and "00000000." In resource prediction section 503, "23087232" is found as band information 607 by dividing the file offset information 603 difference by the playback timing information 602 difference. When the value of band information 607 is larger, a large resource amount—for example, CPU utilization, necessary amount of memory, or the like—is necessary. In resource prediction section 503, necessary band information 606 is calculated for each playback timing information 605 stored in consumption resource information 604 by means of the same kind of calculation. That is to say, in this embodiment, even if content is created by combining content having two different bit rates, necessary band information 606 is calculated for each content part with a different bit rate within a single content. By this means, this embodiment enables necessary resources to be predicted accurately.

FIG. 7 shows an example of a resource prediction table held in resource prediction section 503 of content playback apparatus 501.

Resource prediction table 701 comprises the following information as a set: band information 702, CPU utilization 703, DMA occupancy 704, and necessary amount of memory 705. FIG. 7 shows an example of a resource prediction table in the case of normal-speed forward playback.

Band information 702 is a playback content band. Band information 606 described earlier with reference to FIG. 6B corresponds to band information 702. CPU utilization 703 is CPU utilization necessary when playing back playback content of the corresponding band information 702 band. DMA occupancy 704 is DMA occupancy necessary when playing back playback content of the corresponding band information 702 band. Necessary amount of memory 705 is the amount of memory necessary when playing back playback content of the corresponding band information 702 band.

In FIG. 7, it can be seen that the larger the numeric value of band information 702, the larger necessary resources CPU utilization 703, DMA occupancy 704, and necessary amount of memory 705 become.

In FIG. 7, an example is shown in which three resources—CPU utilization 703, DMA occupancy 704, and necessary amount of memory 705—form a set. However, the present invention can also be configured using a number of resources other than three.

When band information 607 in FIG. 6 is "23087232" as described earlier, the largest categories of band information 702 in FIG. 7 are selected, and resource prediction is 34 for CPU utilization 703, 45 for DMA occupancy 704, and 8 for necessary amount of memory 705.

Figure 8:
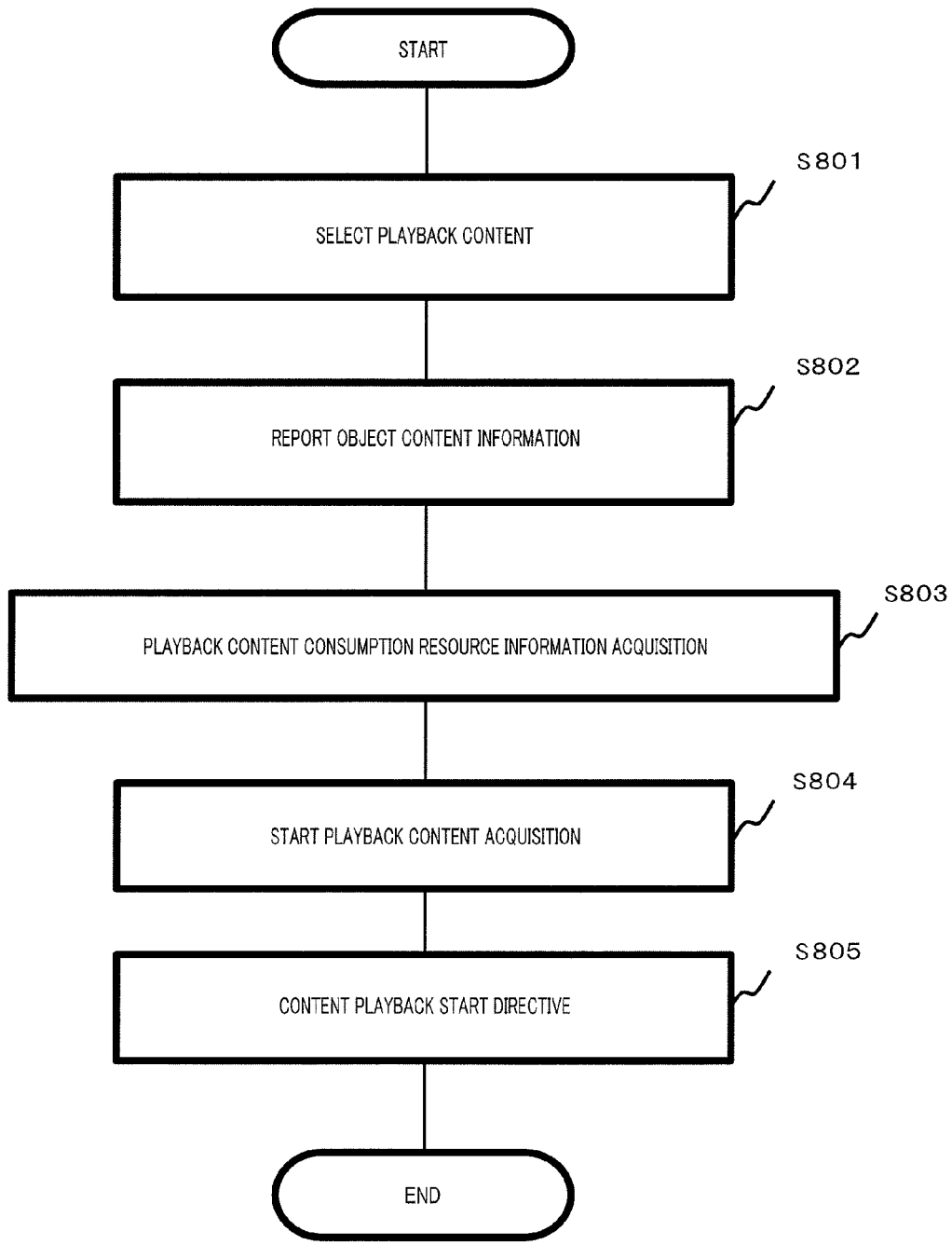
FIG. 8 is a flowchart showing an example of content playback operation of a content playback apparatus according to an embodiment of the present invention.

FIG. 8 is a flowchart showing an example of content playback operation of content playback apparatus 501 according to an embodiment of the present invention.

First, playback control section 506 receives a user's playback start directive from an input apparatus (not shown) (input apparatus 340 in FIG. 3), and starts processing.

Content selection section 507 acquires content information from transmission apparatus 401 connected via a network in accordance with the user directive from playback control section 506, and selects object content to be played back (step S801). Then content selection section 507 reports object content information to resource information acquisition section 505 (step S802).

Resource information acquisition section 505 acquires consumption resource information from transmission apparatus 401 using the reported content information (step S803).

Playback control section 506 starts acquisition of playback content from transmission apparatus 401 using the reported content information (step S804).

Playback control section 506 transfers the acquired playback content to content playback section 504, and directs content playback section 504 to start playback (step S805).

Figure 9:
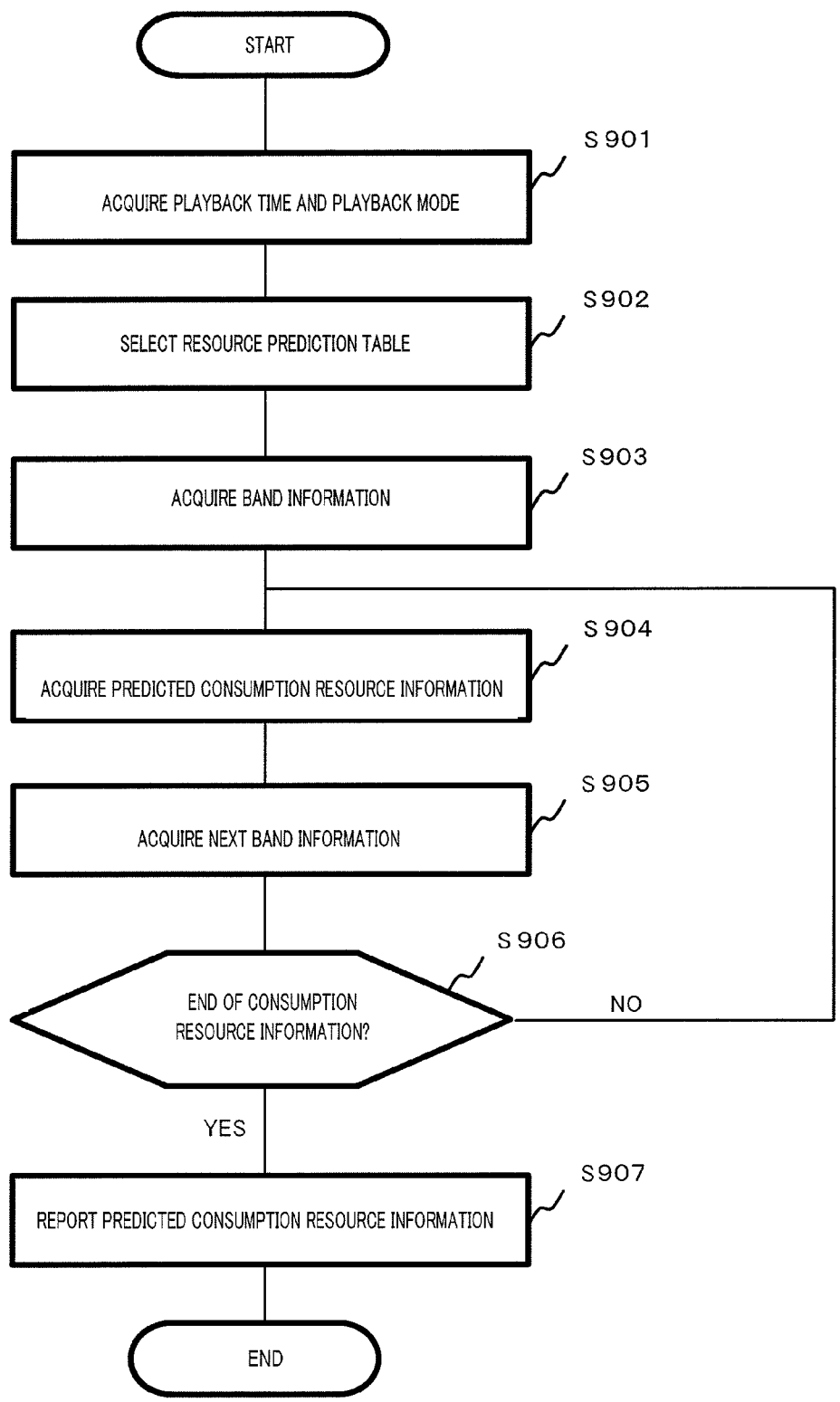
FIG. 9 is a flowchart showing an example of the operating procedure of a resource prediction section of a content playback apparatus according to an embodiment of the present invention.

FIG. 9 is a flowchart showing an example of the operating procedure of resource prediction section 503 of content playback apparatus 501 according to an embodiment of the present invention.

First, resource prediction section 503 receives a predicted consumption resource information inquiry from resource management section 502, and starts processing.

Resource prediction section 503 acquires the current playback time and playback mode from content playback section 504 (step S901).

Resource prediction section 503 selects resource prediction table 701 corresponding to the playback mode (step S902).

Resource prediction section 503 acquires band information corresponding to the acquired playback time from the consumption resource information (step S903).

Resource prediction section 503 acquires predicted consumption resource information corresponding to the band information from data in the resource prediction table decided upon in step S902 (step S904).

For example, if the band information obtained in step S903 is "16000000" when the playback mode is normal-speed forward playback, the CPU utilization is "32," the DMA occupancy is "40," and the necessary amount of memory is "7."

Resource prediction section 503 acquires the next sequence of band information after the band information acquired in step S903 (step S905).

Resource prediction section 503 repeats step S904 and step S905 until consumption resource information data reaches the end (step S906).

Resource prediction section 503 reports the acquired predicted consumption resource information to resource management section 502 (step S907).

By means of the above operation, a content playback apparatus of the present invention can accurately predict a consumption resource after a subsequent arbitrary elapse of time during content playback of a network of a video playback system from a transmission apparatus. By this means, in this embodiment, a content playback apparatus resource can be efficiently utilized for individual content with different playback conditions, and execution of simultaneous parallel processing can be implemented effectively. Here, a subsequent arbitrary elapse of time means an arbitrary elapse of time from playback time of playback by content playback section 504. In this embodiment, even if content is created by combining content having two different bit rates, necessary band information is calculated for each content part with a different bit rate within a single content. By this means, this embodiment enables necessary resources to be predicted accurately.

Resource management section 502 can also perform dynamic resource reallocation for a function that performs other non-real-time processing, utilizing predicted consumption resource information for which a notification is received from resource prediction section 503 in step S907.

An example of a function that performs non-real-time processing here is an advance download of content provided by IPTV (Internet Protocol TeleVision) or the like. Other examples include processing that dubs recorded content to another device via a network, and recorded content re-encoding processing.

Figure 10:
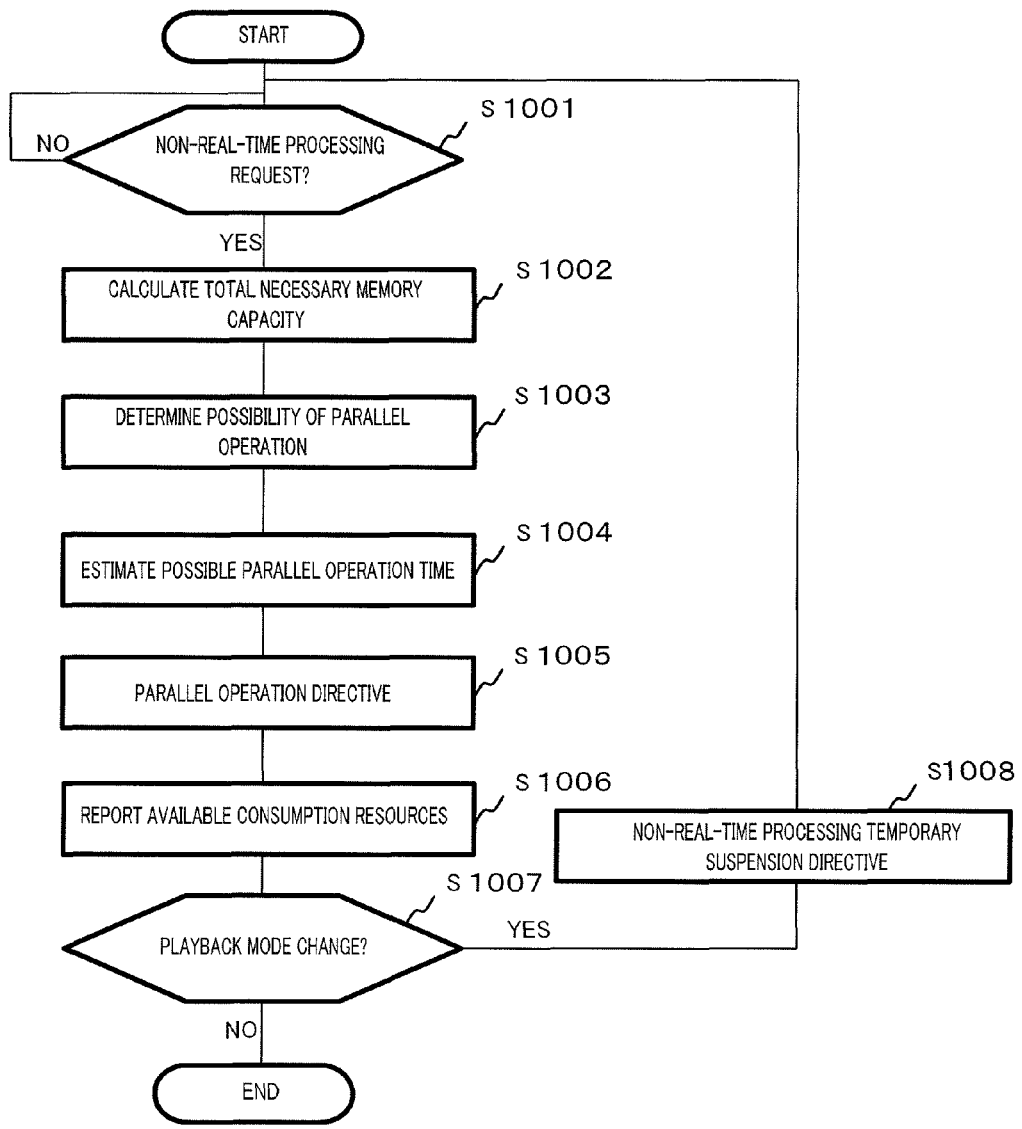
FIG. 10 is a flowchart showing an example of the operating procedure of a resource management section of a transmission apparatus according to an embodiment of the present invention.

FIG. 10 is a flowchart showing an example of the operating procedure when resource management section 502 performs dynamic resource reallocation for a function that performs other non-real-time processing.

If resource management section 502 receives a user input operation or a processing request for performing non-real-time processing generated by a timer, or if there is non-real-time processing that has been suspended (step S1001: YES), resource management section 502 executes step S1002.

Resource management section 502 calculates a total necessary amount of memory by adding together an amount of memory necessary for that function and the current necessary amount of memory included in predicted consumption resource information predicted by resource prediction section 503 (step S1002).

Then resource management section 502 compares the total necessary amount of memory with an available amount of memory installed in the device, and determines whether or not parallel operation is possible based on the comparison result (step S1003). Specifically, resource management section 502 determines that parallel operation can be performed only if the total necessary amount of memory does not exceed the available amount of memory. On the other hand, if the total necessary amount of memory is less than or equal to the available amount of memory, resource management section 502 determines that parallel operation cannot be performed.

Then resource management section 502 sequentially compares the total necessary amount of memory with an available amount of memory in time series order, and estimates a time in which parallel operation is possible (step S1004).

Resource management section 502 directs parallel operation of a function that performs non-real-time processing during an above time in which parallel operation is possible (step S1005).

Also, when resource management section 502 directs parallel operation of a function that performs non-real-time processing, resource management section 502 reports available CPU utilization and DMA occupancy to the function operating in parallel as available consumption resources (step S1006). In making this report, resource management section 502 performs adjustment of the DMA occupancy of the relevant processing by means of the DMA transfer size and DMA instruction issuance frequency so as not to affect real-time processing. Resource management section 502 also adjusts CPU utilization, in a similar way to DMA occupancy, by means of the CPU processing time and frequency.

Resource management section 502 detects a playback control section 506 playback mode change generated by a user input operation or timer (step S1007).

In the event of detecting a playback mode change (step S1007: YES), resource management section 502 issues a temporary suspension directive for a device performing non-real-time processing in parallel operation (step S1008), and executes step S1001.

Resource management section 502 executes resource reallocation again, utilizing predicted consumption resource information reported again from resource prediction section 503 (step S1001).

By repeatedly executing the above processing, it is possible for this embodiment to reallocate resources dynamically.

In the above example, a case has been described in which there is one function that performs real-time processing, but it is also possible to perform processing in a similar way when two or more functions performing real-time processing operate simultaneously.

Also, if time is required at the start or termination of a function performing parallel operation, for instance, it is possible to perform processing more efficiently by finding a time interval in which parallel operation is possible with a time interval necessary for start/termination processing as an offset.

Figure 11:
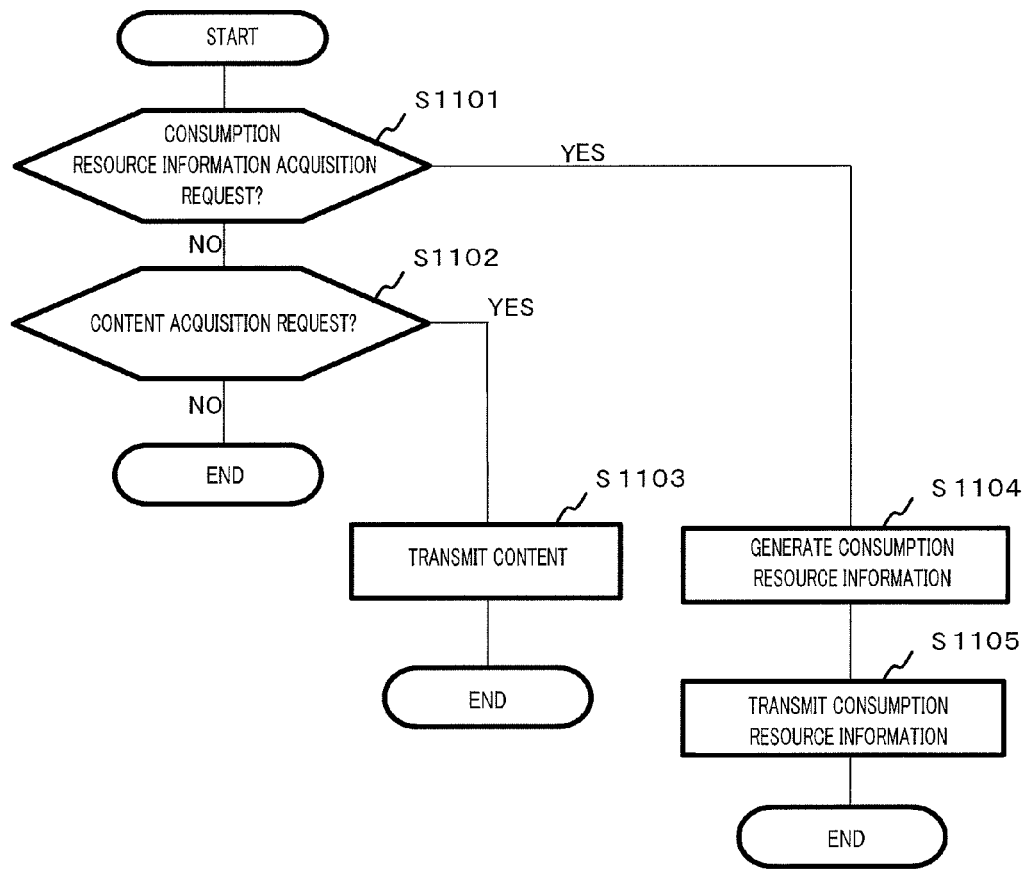
FIG. 11 is a flowchart showing an example of the operating procedure of a transmission control section of a transmission apparatus according to an embodiment of the present invention.

FIG. 11 is a flowchart showing an example of the operating procedure of transmission control section 405 of transmission apparatus 401 according to an embodiment of the present invention. First, transmission control section 405 receives an information acquisition request from another device, and starts processing.

If a request from content playback apparatus 501 is a consumption resource information acquisition request (step S1101: YES), transmission control section 405 executes step S1104.

If a request from content playback apparatus 501 is a content acquisition request (step S1102: YES), transmission control section 405 executes step S1103.

Transmission control section 405 issues a directive to content recording section 403, and transmits playback content to content playback apparatus 501 (step S1103).

Transmission control section 405 issues a directive to resource information generation section 404, and resource information generation section 404 generates consumption resource information (step S1104).

Transmission control section 405 transmits consumption resource information generated in step S1104 to content playback apparatus 501 (step S1105).

By means of the above, a transmission apparatus of the present invention can provide consumption resource information to a content playback apparatus via a network.

By this means, a content playback apparatus can easily predict a subsequent consumption resource during content playback via a network.

A content playback apparatus is not limited to a playback apparatus, but also includes a recording/playback apparatus such as a hard disk recorder, provided with a recording function and playback function.

In this embodiment, use of a hard disk as a medium that records content has been described, but the present invention can also be configured with an optical disk, semiconductor memory, or the like, as well as a hard disk.

In this embodiment, a resource prediction table has been described as a single table corresponding to a mode at the time of normal-speed forward playback. However, this embodiment may also be provided with a plurality of resource prediction tables corresponding to a plurality of different playback modes of a playback apparatus.

Each configuration element of this embodiment has been described using hardware, but implementation by means of software is also possible. It is also possible for hardware control steps to be implemented by means of software control steps. In this embodiment, it is possible for software configuration elements and control steps to be incorporated as programs in one or a plurality of LSIs, and to be implemented by one or a plurality of LSIs.

The disclosure of Japanese Patent Application No. 2010-025076, filed on Feb. 8, 2010, including the specification, drawings and abstract, is incorporated herein by reference in its entirety.

INDUSTRIAL APPLICABILITY

A video playback system according to the present invention has a function of exchanging consumption resource information between a transmission apparatus and a content playback apparatus beforehand, and makes it possible to accurately predict resources necessary for stream playback under different playback conditions. Consequently, a video playback system according to the present invention can be applied to such applications as a hard disk recorder or such-like AV device, a computer terminal, a mobile terminal, or the like, having a network function.

REFERENCE SIGNS LIST 11, 401 Transmission apparatus
12, 501 Content playback apparatus
13 Network
210, 310 CPU
220, 320 Memory apparatus
221, 321 ROM
222, 322 RAM
225, 325 Hard disk drive
226, 326, 341, 346 Interface
230, 330 Communication apparatus
233, 333 Communication channel
250, 350 Bus line
340 Input apparatus
345 Display apparatus
402 Management information recording section
403 Content recording section
404 Resource information generation section
405 Transmission control section
406 Communication control section
502 Resource management section
503 Resource prediction section
504 Content playback section
505 Resource information acquisition section
506 Playback control section
507 Content selection section
508 Communication control section
601 Management information
602, 605 Playback timing information
604 Consumption resource information
606, 607, 702 Band information
701 Resource prediction table
703 CPU utilization
704 DMA occupancy
705 Necessary amount of memory

The invention claimed is:

1. A video playback system that performs streaming playback of content recorded in a transmission apparatus, by a content playback apparatus connected via a network, wherein:

the transmission apparatus includes:
    a content recorder that records the content;
    a management information recorder that records management information, including a plurality of playback timing information and a plurality of file offsets corresponding to the plurality of playback timing information of the content;
    a resource information generator that generates consumption resource information, associating the plurality of playback timing information of the content and a plurality of content band information based on the management information; and
    a transmission controller that controls transmission of the content and the consumption resource information,
and
the content playback apparatus includes:
    a content selector that selects content that is to be played back and requests the selected content from the transmission apparatus;
    a playback controller that acquires the selected content from the transmission apparatus via the network;
    a resource information acquirer that acquires the consumption resource information corresponding to the content;
    a content player that plays back the acquired content; and
    a resource predictor that calculates band information of the content that is played back after an elapse of time, based on a playback time obtained from the content player, playback mode information, and the consumption resource information,
    wherein the resource predictor calculates each of the plurality of content band information in the consumption resource information by dividing a difference between two file offsets of the plurality of file offsets in the management information by a difference between two of the plurality of playback timing information corresponding to the two file offsets in the management information.

2. The video playback system according to claim 1, wherein each of the plurality of playback timing information associated with the consumption resource information generated by the resource information generator is a playback time from a start of a playback of the content.

3. The video playback system according to claim 1, wherein the resource predictor calculates the band information of the content after an elapse of time from the playback time of playback by the content player.

4. The video playback system according to claim 1, wherein the resource predictor calculates the band information of content that is played back after the elapse of time according to a playback speed at which the content is played back by the content player.

5. The video playback system according to claim 1, wherein the resource predictor detects a change in a playback speed at which the content is played back by the content player, and calculates the band information of content that is played back after the elapse of time based on the detected change.

6. A transmission apparatus that transmits content to a content playback apparatus connected via a network, the transmission apparatus comprising:
 a content recorder that records the content;
 a management information recorder that records management information, including a plurality of playback timing information and a plurality of file offsets corresponding to the plurality of playback timing information of the content;
 a resource information generator that generates consumption resource information, associating the plurality of playback timing information of the content and a plurality of content band information based on the management information; and
 a transmission controller that controls transmission of the content and the consumption resource information,
 wherein each of the plurality of content band information is calculated by a resource predictor provided in the content playback apparatus, by dividing a difference between two file offsets of the plurality of file offsets in the management information by a difference between two of the plurality of playback timing information corresponding to the two file offsets in the management information.

7. The transmission apparatus according to claim 6, wherein:
 the resource information generator generates the consumption resource information in a playback time order of the content; and
 the transmission controller transmits the consumption resource information of content specified by the content playback apparatus to the content playback apparatus.

8. The transmission apparatus according to claim 6, wherein each of the plurality of playback timing information associated with the consumption resource information generated by the resource information generator is a playback time from a start of the content.

* * * * *